Figure 4:
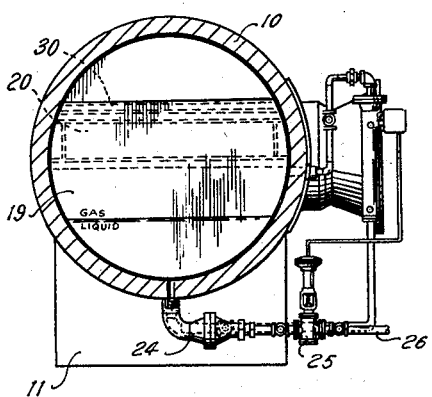

Nov. 3, 1959 C. A. LAVERY 2,911,058
OIL AND GAS SEPARATORS
Filed April 16, 1956 3 Sheets-Sheet 1
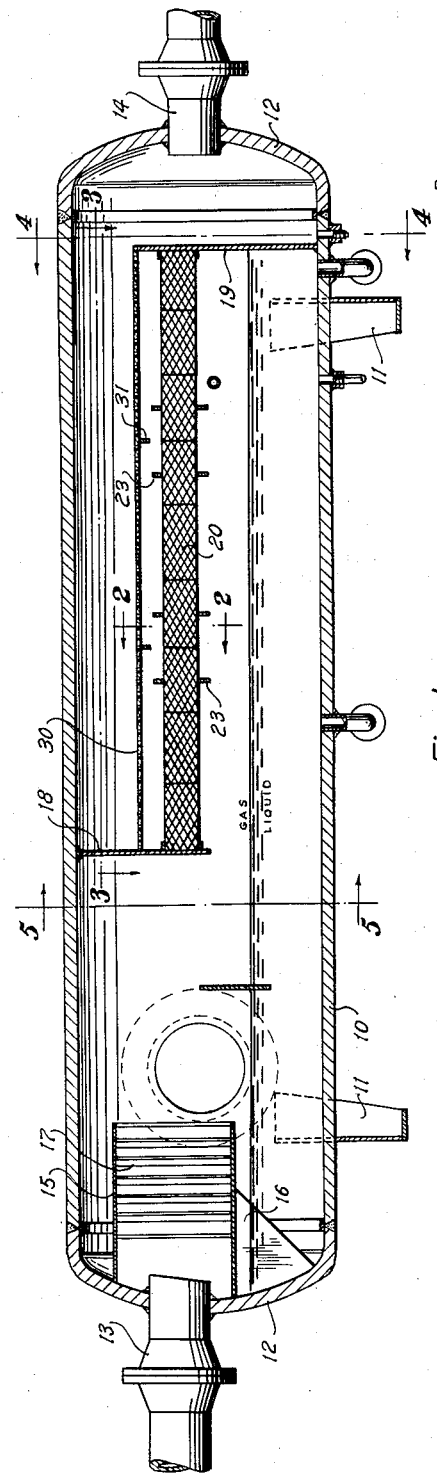
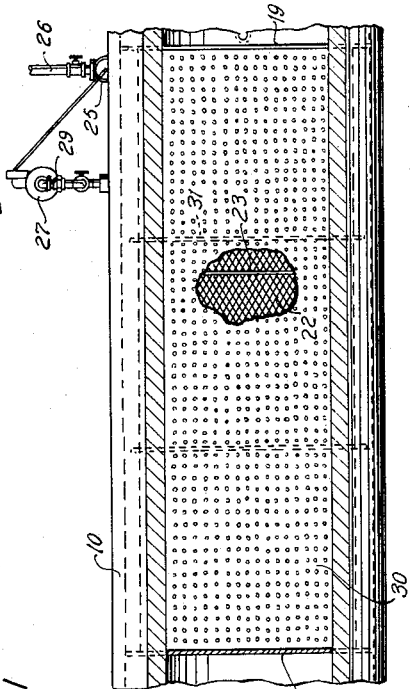
Fig.3
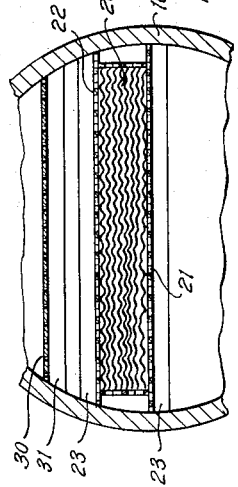
Fig.2
INVENTOR
Charles A. Lavery
BY
ATTORNEYS INVENTOR
Charles A. Lavery

BY

ATTORNEYS

Nov. 3, 1959
C. A. LAVERY
2,911,058
OIL AND GAS SEPARATORS
Filed April 16, 1956
3 Sheets-Sheet 3
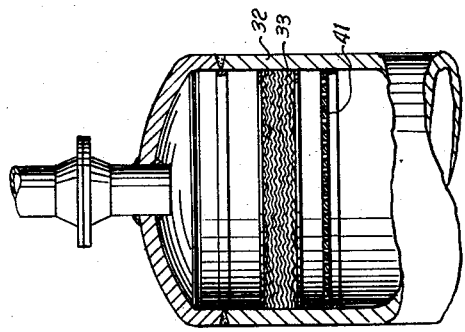
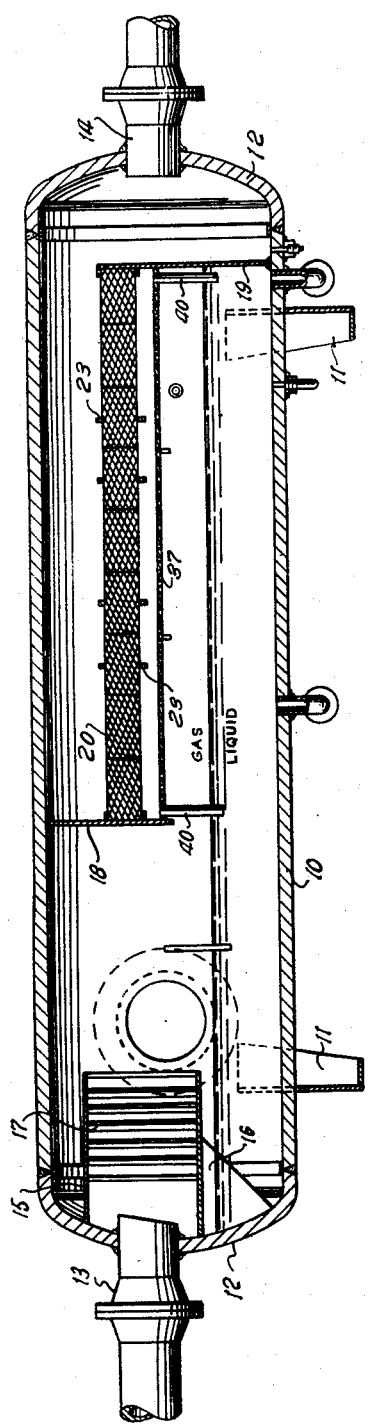
INVENTOR.
BY *Charles A. Lavery*
*Ahley & Ahley*
ATTORNEYS

United States Patent Office 2,911,058
Patented Nov. 3, 1959

2,911,058

OIL AND GAS SEPARATORS

Charles A. Lavery, Tulsa, Okla., assignor to National Tank Company, Tulsa, Okla., a corporation of Nevada Application April 16, 1956, Serial No. 578,542

6 Claims. (Cl. 183—2.7)

This invention relates to new and useful improvements in oil and gas separators.

The invention is particularly concerned with vertical and horizontal liquid and gas separators as employed in the oil fields for the removal of water and hydrocarbons from a well flow stream which is largely gaseous in nature.

It has been a practice in the oil industry in various types of vessels in which a gas stream is separated or segregated from a liquid phase, to employ mist extractors constituting a metallic mesh or maze having many and intricate passages of small size for the removal of mechanically entrained droplets and minute liquid particles from a gas stream leaving the vessel. The wire mesh material may take any of several forms such as relatively coarse steel or metallic wool, knitted wire mats formed of fine metallic wire knitted in two dimensions or three dimensions to form a mat or layer, any number of which may be superposed to form the wire mesh pad or mat, or any other type of structure in which a multiplicity of fine metallic strands or members are arranged at random with respect to one another, or in a predetermined pattern, in order to provide a multiplicity of small restricted passages which are tortuous in configuration and which provide a very large number of scrubbing or impingement surfaces, as well as wettable surfaces, with which a gas stream comes in contact as the gas flows through the mist extractor structure.

As used herein, the term "wire mesh pad" includes any and all of the above described structures as well as any sponge-like, mesh-like, fibrous-like, or other type of pad or mat formed of metal or other material and which presents to a flowing gas stream a multiplicity of tortuous passages along with a multiplicity of scrubbing, impingement, or wettable surfaces over which the gas is caused to flow, and which is characterized by high permeability whereby the resistance of the pad to the flow of gas therethrough is very low, and very small pressure drops are caused in a gas stream passing therethrough.

It has now been discovered that wire mesh pads of the character described may be efficiently and effectively employed for a separation of water and hydrocarbons from the gaseous phase of a petroleum well stream flowing in very large volumes. Thus, it has been discovered that this structure may be employed not as a simple mist extractor, but as a primary separating element, and further, that very large volumes of gas may be adequately handled in place of the relatively small volumes previously thought possible.

In order, however, to carry out this desirable separating action, adequate areas of the wire mesh pads must be presented to the flowing stream, and provision must be made for relatively uniform distribution of the flow stream over the area of wire mesh pad available. Otherwise, adequate separation is not obtained and the proper separator action is not realized.

It is, therefore, one object of this invention to provide an improved liquid and gas separator for use upon petroleum well streams or other streams of flowing gas and liquids such as water and hydrocarbons, wherein an expanse of wire mesh pad is effectively employed as a liquid gas separator with provision being made for assurance of substantially uniform flow through all areas of the pad to prevent excessive flow through one section of the pad and the consequent overloading of said section.

A further object of the invention is to provide a device of the character described having means for applying a substantially uniform back pressure to the wire mesh pad and thereby creating a moderate pressure drop mesh pad and thereby creating a moderate pressure drop slightly in excess of the pressure drop through the pad and sufficient to insure substantially uniform flow of the gaseous phase through all sections of the pad whereby full efficiency and effectiveness thereof is obtained.

A still further object of the invention is to provide a device of the character described wherein a perforated or foraminous plate or partition spaced downstream of the wire mesh pad in the separation vessel produces a predetermined pressure drop sufficiently in excess of the pressure drop in the wire mesh pad as to become controlling in the flow of gas and thereby causes uniform and evenly-distributed passage of the gas through the pad for effective separation.

Yet another object of the invention is to provide an improved device of the character described in which a foraminous member may be employed downstream of the wire mesh pad or both upstream and downstream of the pad, and in which the resistivity of the member to the flow of gas is sufficiently greater than the resistivity of the pad as to insure substantial uniformity of flow through the pad; and further, in which the resistivity of the member is greater than that of the pad by a multiple greater than that by which the resistance to gas flow downstream of the member in the separator exceeds the resistivity of the member, whereby the member remains in control of gas distribution over the area of the pad.

An additional object of the invention is to provide an improved horizontal liquid and gas separator wherein a liquid-bearing gas stream is passed horizontally in an elongate flow path within a separator vessel for the removal and settling of much of the liquid from the stream, and the gas stream is then passed through a wire mesh pad of large expanse with provision for insuring substantial uniformity of flow through the pad.

A further object of the invention is to provide an improved separator of the character described in which a perforated or foraminous plate or partition is provided upstream only of the wire mesh pad, the opening sizes and distribution of the partition being regulated to insure adequate and uniform distribution of the gas flow over the area of the wire mesh pad.

Other and more particular objects will be apparent from a reading of the following description and specification.

A construction designed to carry out the invention will be hereinafter described together with other features of the invention.

Figure 5:
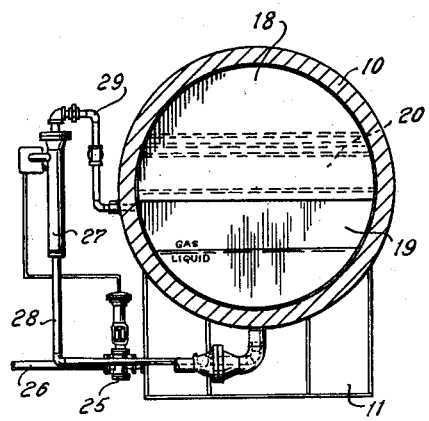
Figure 6:
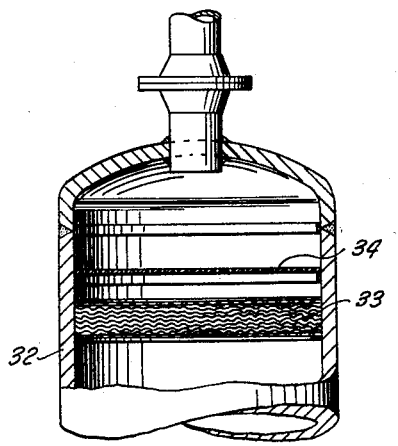
Figure 7:
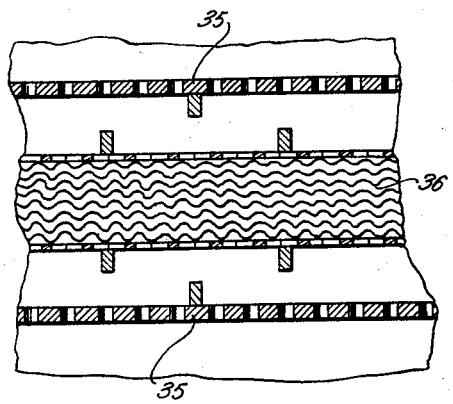

The invention will be more readily understood from a reading of the following specification and by reference to the accompanying drawings, wherein examples of the invention are shown, and wherein:

Fig. 1 is a vertical, longitudinal, sectional view of a horizontal separator constructed in accordance with this invention, Fig. 2 is an enlarged, fragmentary, vertical sectional view taken upon the line 2—2 of Fig. 1, Fig. 3 is a horizontal, cross-sectional view taken upon the line 3—3 of Fig. 1, Figs. 4 and 5 are vertical, transverse, sectional views, taken upon the respective lines of Fig. 1, Fig. 6 is a fragmentary view of a proportion of a vertical separator, the view being partly broken away to illustrate the application of the invention to a vertical separator structure, Fig. 7 is a vertical, longitudinal, fragmentary view of a wire mesh pad employed as a separating unit in either a vertical or horizontal separator and including as a further modification of the invention perforated plates above and below the pad, Fig. 8 is a longitudinal, vertical, sectional view of a further modification of the invention, and Fig. 9 is a vertical sectional view of yet another modification of the invention.

This application is a continuation-in-part of the copending application of Charles A. Lavery, Serial No. 465,843, filed November 1, 1954, now abandoned.

In the drawings, the numeral 10 designates an elongate horizontal vessel carried upon legs 11 and having its ends closed by heads 12. A stream inlet pipe or fitting 13 extends through one head of the vessel for admitting thereto a gas or well flow stream, and a discharge pipe or fitting 14 is provided in the opposite head of the tank for discharging therefrom gas from which liquids such as water and hydrocarbons have been separated. An inlet scrubber box 15 is supported internally of the vessel 10 upon suitable bracket or gusset plates 16 and encloses the inlet conductor 13 whereby gas and fluids entering the tank are caused to flow through the box. The box is provided with a plurality of vertical baffle or scrubber elements 17 which divert the flow of the incoming fluid, causing large liquid particles to be removed therefrom for draining to the lower portion of the vessel 10, and which further break up and diffuse the flow of fluid to reduce its velocity and spread the same through the interior of the vessel 10.

Near its medial portion, the vessel is provided with a semi-partition or baffle 18 extending vertically downwardly from its upper wall and terminating near the horizontal axis of the vessel. Since the partition 18 is imperforate, gas must flow thereunder as it passes through the vessel toward the outlet 14. Similarly, a second partition or baffle 19 is provided in the vessel near the outlet fitting 14 and projects upwardly from the bottom wall of the vessel to a point spaced from the upper wall thereof. Here again, the partition 19 being imperforate, the flow stream must pass upwardly and over the upper edge thereof to reach the outlet 14.

A wire mesh pad 20 extends horizontally within the vessel 10 between the baffles 18 and 19, the pad being disposed transversely between the side walls of the vessel so as to provide a continuous pervious partition through which the gas stream must flow. The wire mesh pad may be mounted and supported in any suitable fashion, as between the expanded metal panels 21 and 22 engaging and confining its lower and upper surfaces respectively, the panels, in turn, being supported and held in position upon suitable transverse bars or supports 23.

The angular disposition of the wire mesh pad is not critical so long as an adequate expanse thereof is provided for efficient separation from the gas stream, and so long as the draining of separated liquids from the pad does not interfere in any way with the separating action. In the form illustrated in Fig. 1 of the drawings, it is quite apparent that a very large expense of wire mesh pad may be provided within a vessel of limited dimensions due to the horizontal disposition of the pad within the horizontal vessel, and the change in direction which the gas is caused to undergo. Further, the horizontal disposition of the pad coupled with a substantially vertical movement of the gas stream therethrough, aids considerably in the separating and scrubbing action, causing the wire mesh separator pad structure to function as its own mist extractor and minimizing the possibility of liquid or liquid particles being carried over in the gas stream into the outlet 14.

The horizontal flow of the inlet stream in passing from the inlet fitting 13 through the interior of the vessel 10 into proximity with the wire mesh pad 20, due to the elongate horizontal path through which the gas is caused to flow, results in the removal of much liquid from the inlet stream due to the reduction in velocity of the stream and the opportunity provided for the settling of liquid particles therefrom. These separated liquids, plus the liquids removed in the pad 20, of course collect in the lower portion of the vessel 10 between the inlet head 12 and the partition 19, and may be drawn off from time to time through the liquid outlet fitting 24, provided in the bottom wall of the vessel 10 near the partition 19 and communicating through a diaphragm operated valve 25 with a discharge pipe 26 leading to the storage tanks or other suitable storage facilities. Any suitable or desirable means may be employed for controlling the operation of the valve 25, as, for instance, the float operated pilot valve structure 27 connected into the vessel 10 through the pipe 28 leading to a point in the vessel below the normal liquid level, and the gas equalizer pipe 29 leading from the float structure into the vessel 10 above the normal liquid level. With these connections, a liquid level will be maintained within the unit 27 in accordance with the level existing in the tank 10, and the pilot structure properly actuated for opening and closing the valve 25 to maintain the desired liquid level in the vessel 10. Normally, this level is spaced somewhat below the pad 20 as shown in Fig. 1 in order to provide sufficient flow space between said level and the lower edge of the partition 18. The maintenance of liquid levels in separating vessels is common in this art, and the means of accomplishing the same is not critical to this invention.

It will be noted that the flow of gas through the separator vessel is dependent upon the pressure drops encountered in the inlet and outlet fittings as well as the pressure drops involved in flowing between the liquid surface and the pad 20, through the pad 20, between the pad 20 and the upper wall of the vessel, and over the upper edge of the partition 19 into the outlet fitting 14. It is not practical to so design the separator and incorporate therein such baffles, vanes, and other fittings as might be required to achieve uniformity of flow through the wire mesh pad 20 in view of these various somewhat indeterminate pressure drops or resistivities which are encountered. Thus, in practice, portions of the pad 20 will tend to transmit considerably greater quantities of gas than other portions thereof, and the separating efficiency of these high-flow sections would be considerably impaired. Inherently, the pressure drop in the gas stream caused by the pad 20 is very low and may be of the magnitude of one-half inch of water or less, even though the gas velocity through the pad may be from six to ten feet per second. Hence, the pad 20 does not of itself offer sufficient back pressure as to result in an equalization of gas flow and even distribution of the flow over the entire pad area. Consequently, other pressure drops in the vessel become controlling, and the gas stream follows the path of least resistance and may concentrate in relatively small areas of the pal 20 with the result that inefficient separation is obtained.

In the present invention, a perforated or foraminous plate 30, wire cloth, or other membrane of establishable resistance to gas flow is positioned in the vessel 10 above the pad 20 and extends horizontally between the side walls of the vessel and between the partition 18 and the upper edge of the partition 19. The plate 30 is spaced a short distance above the surface of the pad 20 and is suitably supported in the vessel by attachment to the partition 18 and 19, as well as upon transverse support members 31. The perforated plate 30 offers a greater resistance to the flow of gas than the pad 20 and causes a greater pressure drop than the pad in the gas stream passing therethrough. Consequently, the pad 20 ceases to be the controlling factor in determining the flow of the gas, this control being taken over by the plate 30 which creates a small but adequate back pressure sufficient to cause the gas stream to equalize over the area of the wire mesh pad 20 and flow uniformly through all parts thereof whereby separation efficiency is maintained. This is true even though the pressure drop in the gas stream in passing from the plate 30 to the outlet 14 is greater than the pressure drop of the gas in passing through the plate 30.

The nature of the plate 30 is not critical although it is preferable to employ a perforated plate which may receive openings of any selected size arranged in any desired pattern with any desired frequency. Closely woven wire cloth and other similar materials may be employed but considerable trial and error may be necessary to obtain the desired mesh size and spacing.

As pointed out hereinabove, it is important that the pressure drop through the plate or member 30 be greater than the pressure drop through the pad 20, and there apparently is no upper limit to what the pressure drop of the member 30 may be. Normally, it is desired to provide an overall pressure drop in a separator of this type of as a low a figure as possible, and hence, it is disadvantageous to incorporate too great a resistance to a gas flow in the member 30. The lower limit of resistivity of the member 30 will depend on the shape and size of the vessel 10, the turns through which the gas must pass in traversing the vessel, reduction and enlargement losses in the gas flow, and so forth. For this reason, it is not possible to specify an exact or critical or lower limit other than the requirement that the pressure drop in the member 30 be greater than the pressure drop in the pad 20, and that the member 30 be the controlling element in the distribution of the gas flow pass upstream in the vessel of the member 30. In most cases, the pressure drop through the plate 30 should be something from 3 to 10 times the pressure drop in the pad 20, or should be a multiple of the pressure drop in the pad 20 greater than the multiple by which the pressure drop in the vessel downstream of the member 30 exceeds the pressure drop in said member. As an example, assuming a pressure drop of one-half inch of water in the pad 20 and a pressure drop of ten inches of water in the vessel downstream of the member 30, the pressure drop in the member 30 should be in the neighborhood of two and one-half inches of water which is five times the drop in the pad 20 but only one-fourth of the drop downstream of the member 30.

As a further specific example, with the assumption of a given volume of flow, the dimensions of a vessel adequate to handle such flow may be determined in accordance with common procedure in this art, and an area of wire mesh pad incorporated in the vessel sufficient to achieve the desired rate of gas flow through said pad necessary for efficient separation as determined empirically or from tests of the pad manufacturer. Having this information and knowing the pressure drop through the selected pad, the degree of porosity or number of perforations of a certain size in the member 30 may be readily calculated as follows:

Assuming that 50 million standard cubic feet per day of 0.7 specific gravity gas are to flow through the wire mesh pad at 1000 pounds per square inch gauge and 80° F., and desired to determine the number of holes of ¼ inch diameter necessary in the plate 30 to provide a pressure drop of 1 inch of water across the plate 30.

The relationship used in calculating the number of holes necessary to accomplish this end is as follows:

$$Q = C\sqrt{\frac{29}{MW} \times \frac{520}{T} \times z} \times p\sqrt{h}$$

where $Q$ = flow per hole in cubic feet per minute
$C$ = orifice coefficient for ¼" holes = 0.3
$MW$ = molecular weight of gas
$T$ = absolute temperature of gas in degree Kelvin
$z$ = compressibility factor of gas
$p$ = pressure, pounds per square inch absolute
$h$ = pressure drop through perforations, inches of water For the assumed conditions:

$MW = 0.7 \times 29$
$T = 460 + 80 = 540°$
$p = 1015$ pounds per square inch absolute
$h = 1$ inch water $z$ is computed by the method outlined in Natural Gasoline Supply Men's Association Date Book, 1951 edition, pages 81 and 82.

From the above publication, Fig. 4 gives the pseudo-critical pressure as 668 p.s.i.a. Fig. 5 gives the pseudo-critical temperature at 385° A., and Fig. 3 gives the pseudo-reduced pressure as the quotient of the absolute pressure divided by the molecular average critical pressure, which is 1015 divided by 668, or 1.52.

From Fig. 3, the pseudo-reduced temperature equals absolute temperature divided by molecular average critical temperature which is $$\frac{540}{384} = 1.4$$

With the foregoing, and from Fig. 4, a value for $z$ of 0.87 is obtained.

Solving the above equation for Q gives a value of 10.45 standard cubic feet per minute per hole, and the number of ¼ inch holes required $$= \frac{50,000,000}{1440 \times 10.45}$$

which in turn = 3320.

Obviously, the same procedure may be employed for other quantities of gas of other nature, or a simple empirical approach may be employed to determine the necessary degree of perforation by trial and error.

In the above example, a pressure drop in the wire mesh pad of 0.3 inch of water was established, and therefore, the pressure drop through the member 30 is in excess of three times the pressure drop in the pad. Under these conditions, so long as the pressure drop in the vessel downstream of the member 30 does not exceed 3 inches of water, the member 30 will remain in control of the gas flow and will result in substantially equal distribution of the flow over the entire area of the pad 20.

The structure is also applicable to vertical separators as shown in Fig. 6 wherein the separator vessel 32 is provided with a wire mesh pad 33 extending thereacross and a perforated or foraminous plate 34 in the vessel and spaced above the pad 33. Further, in some instances, a perforated or foraminous member 35 may be provided both above and below the wire mesh pad 36, as shown in Fig. 7. In such cases, it is desirable that the pressure drop of the upstream plate 35 be less than the pressure drop of the downstream plate 35, and some additional uniformity of flow from the latter structure may be anticipated.

It is to be noted that the combination structure of Fig. 1 is particularly advantageous in its provision of the elongate horizontal flow path for the gas stream, in which considerable quantities of liquid may separate and settle from the stream, followed by the passage of the gas stream through the wire mesh pad under controlled conditions whereby uniformity of flow and efficient separation is obtained. There is thus provided a very simple yet very effective separator having a very low overall pressure drop.

As shown in Figs. 8 and 9, both the horizontal and the vertical forms of the separator may be modified to include a foraminous plate or partition upstream only of the wire mesh pad. The separator of Fig. 8 is substantially identical to that of Fig. 1 except that the plate 30 is omitted, and a similar, perforated or foraminous plate or partition 37 is positioned in the separator shell 10 below or upstream of the pad 20. The partition 37 is spaced from the pad 20 and extends substantially parallel thereto so as to function to divide and uniformly distribute the gas stream passing through the partition.

Similarly, the form of the invention shown in Fig. 6 may be moodified as shown in Fig. 9, the partition 34 being omitted, and the perforated or foraminous partition 41 being positioned within the vessel 32 below the wire mesh pad 33.

In order to divide the gas stream properly and provide uniform flow through the wire mesh pad, the partitions 37 and 41 must have a resistivity to gas flow greater than that of the pad, must be spaced from the pad, and yet, must be disposed adjacent the pad so that channeling of the gas stream through the pad is minimized or eliminated. In general, the resistivity of the partitions 37 and 41 should be about 3 to 10 times the resistivity of the pads 20 and 33, respectively, or, the design requirements as to the resistivity of the partitions 37 and 41 may be the same as those set forth hereinbefore in connection with the first and second forms of the invention. Further, the specific design characteristics or dimensions may be determined as recited in detail in the sample calculations given hereinbefore for the form of the invention shown in Fig. 1.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An oil and gas separator for separating liquids from a flowing gas stream of large volume, including, a vessel having an inlet and an outlet, a wire mesh pad in the vessel interposed between the inlet and outlet and through which the gas stream is caused to flow, a foraminous member in the vessel isolating the wire mesh pad from the vessel outlet whereby the gas stream is required to flow through the foraminous member, said member having a resistivity to the flow of gas greater than that of the pad by a multiple greater than the multiple by which the resistivity of the interior of the vessel between the member and the outlet exceeds the resistivity of the member, and a liquid outlet from the vessel.

2. An oil and gas separator as set forth in claim 1, means for maintaining a level of separated liquids in the lower portion of the vessel, a first partition in the vessel extending from the upper wall thereof to a point spaced above the liquid level, a second partition in the vessel extending from the lower wall thereof to a point spaced above the liquid level, and the wire mesh pad extending between the first and second partitions, and the foraminous member extending between the first and second partitions and being spaced from the wire mesh pad.

3. An oil and gas separator as set forth in claim 1, and a second foraminous member in the vessel isolating the wire mesh pad from the vessel inlet.

4. An oil and gas separator as set forth in claim 1, and a second foraminous member in the vessel spaced from the wire mesh pad and isolating the pad from the vessel inlet, the second foraminous member having a resistivity to the flow of gas therethrough less than the resistivity of the first named foraminous member.

5. An oil and gas separator for separating liquids from a flowing gas stream of large volume, including, a vessel having an inlet and outlet, a wire mesh pad in the vessel interposed between the inlet and outlet and through which substantially the entire gas stream is caused to flow, a foraminous member in the vessel spaced from the wire mesh pad and through which substantially the entire gas stream is caused to flow, said member having a resistivity to the flow of gas greater than that of the pad by a multiple greater than the multiple by which the resistivity of the interior of the vessel between the member and the outlet exceeds the resistivity of the member, and a liquid outlet from the vessel.

6. An oil and gas separator as set forth in claim 5 wherein the foraminous member has a resistivity to the flow of gas greater than that of the wire mesh pad by a multiple of 3 to 10.

References Cited in the file of this patent

UNITED STATES PATENTS

| | | |
|---|---|---|
| 2,521,785 | Goodloe | Sept. 12, 1950 |
| 2,586,935 | Gerson | Feb. 26, 1952 |
| 2,685,938 | Walker et al. | Aug. 10, 1954 |
| 2,710,071 | Kinser et al. | June 7, 1955 |
| 2,770,320 | Dreznes | Nov. 13, 1956 |
| 2,812,034 | McKelvey | Nov. 5, 1957 |